Nov. 18, 1947.  D. C. McGAHEY  2,431,063
BEAN SPROUTING METHOD AND KIT
Filed Aug. 19, 1943
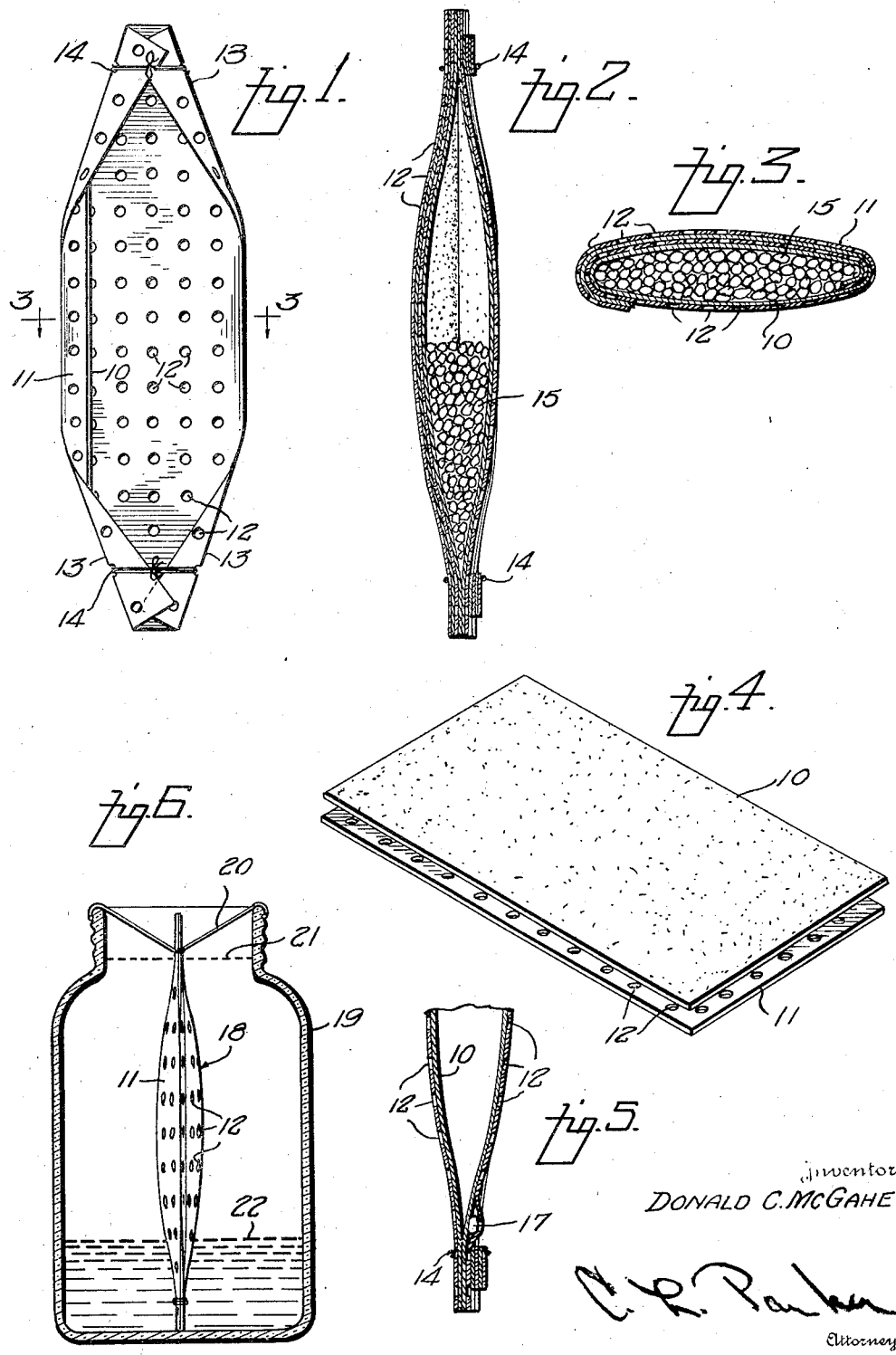
Inventor
DONALD C. McGAHEY
Attorney Patented Nov. 18, 1947

2,431,063

UNITED STATES PATENT OFFICE 2,431,063

BEAN SPROUTING METHOD AND KIT

Donald C. McGahey, Cincinnati, Ohio; Gordon H. Scherer, administrator of said Donald C. McGahey, deceased, assignor to Mildred C. McGahey, Elkhorn, Wis.

Application August 19, 1943, Serial No. 499,281

8 Claims. (Cl. 47—14)

This invention relates to a bean seed sprouting method and kit.

The use of bean sprouts is increasing materially because of their food value, and particularly because of their high protein content. However, the sprouting of the beans requires frequent attention when done on a small scale in the individual home. For example, it is necessary that the beans be soaked and subsequently drained, after which they must be watered or sprinkled several times a day and uncovered frequently and shaken up to provide the necessary access of air to the beans to enable them to sprout.

I have found that beans may be very easily and readily sprouted in the home with the minimum amount of attention by the housewife, and the method involved is particularly easily carried out with a simple form of kit which readily may be purchased in retail stores ready for use without special preparation or the use of any special implements or utensils other than a common glass fruit jar or similar vessel.

The present method contemplates the soaking of the beans for a period of time necessary to allow the beans to absorb the moisture required to initiate the sprouting of the beans. Thereafter, the beans are kept supplied with the moisture necessary to carry on the sprouting action by utilizing the capillary action of a water-absorbent medium, such medium progressively and continuously supplying the necessary moisture during the sprouting period while at the same time allowing the beans to be subjected to the air necessary to the sprouting action.

More specifically, the method comprises the housing of a quantity of beans in a container which is porous and highly absorbent and of a capacity greater than the quantity of beans placed in such container to allow for the expansion occurring by the sprouting action. Such container is immersed in a vessel filled with water to allow the dried beans to absorb the moisture necessary to initiate the sprouting action. After the beans have absorbed the desired quantity of water, the vessel is partially emptied of water or the bean container is placed in another vessel having only sufficient water therein to immerse the lower end of the absorbent container without immersing the beans, the quantity of water being sufficient to carry out the complete sprouting action without the necessity of having to add more water to the container. After having soaked the beans, therefore, the container with the relatively small necessary quantity of water therein may be set aside without further attention throughout the sprouting period, for example, from three to five days. The bean container then may be removed from the vessel and opened to permit the removal of the bean sprouts which are then ready for cooking. The method also contemplates the maintenance in the water of a sufficient quantity of a chemical, for example chlorinated lime, to prevent any possible stagnation of the water during the sprouting period. The use of the chemical, however, obviously is not wholly necessary.

In the drawings I have shown a kit particularly adapted for use in the practice of the method. In this showing, Figure 1 is a face view of the kit which is in the form of a package in which the beans may be sold, Figure 2 is a vertical sectional view through the same, showing the capacity of the container relative to the quantity of dried beans before the method is started, Figure 3 is a transverse sectional view on line 3—3 of Figure 1, Figure 4 is a detail perspective view of the sheet material in blank form preferably employed in the making of the kit, Figure 5 is a detail fragmentary sectional view similar to Figure 2 showing a modified form of the invention, and Figure 6 is a sectional view through a conventional glass fruit jar showing the position of the kit therein during the practicing of the method.

Referring to Figure 4, the numeral 10 designates a preferably rectangular sheet of soft porous and preferably highly absorbent paper which is used to form the envelope or container for the beans. This paper may be of single or multiple thickness depending upon the nature of the material used. In the formation of the container as a whole the sheet 10 is backed up by a relatively stiffer sheet 11 which may be formed of flexible material such as paper which is relatively impervious to the action of water and provides the necessary structural strength for the kit or package as a whole. The sheet 11 is perforated preferably closely and throughout its area as at 12.

In the making up of the kit, the sheet or sheets 10 may be placed directly on top of the perforated sheet 11, whereupon a predetermined quantity of beans may be placed on the sheet 10. These sheets are then wrapped around the beans in a rectangular open ended package, after which the four corners of the package are folded inwardly and angularly as indicated by the numeral 13 in Figure 1. These folded corners may be retained in position in any suitable manner, for example by tying strings 14 around the reduced ends of the package thus formed. The strings are readily retained against slipping toward the extremities of the package by being engaged in certain of the notches formed by some of the perforations 12 when the corners of the package are folded. The sheet 10 obviously forms an envelope completely enclosing the beans, while the sheet 11 becomes a form-sustaining envelope for the inner envelope, contacting the latter to reinforce it because of its inherently weak structural strength. In making up the kit as described above, the sheets 10 and 11 form, in effect, a composite envelope of layers of sheet material.

The resultant package will be in the form shown in Figures 1, 2 and 3 and the body of the beans contained within the package is indicated in Figures 2 and 3 by the numeral 15. In folding the sheets 10 and 11 around the beans, the extremities of the sheets may substantially overlap each other as shown in Figure 3. The bag 11 acts as a protector and form-sustaining element for the envelope formed by the sheet 10 which possesses very little structural strength, particularly when it becomes wet during the practice of the method to be referred to further below.

In Figure 5 of the drawing a slightly modified form of the invention has been shown. Such form may be employed when it is desired to positively prevent any stagnation of the water during the sprouting period of the beans. In the modified form of the invention the finished kit is made up as described above, except that before the lower string 14 is tied around the package, a water-soluble capsule 17 containing the desired chemical or water-sweetening agent, such as chlorinated lime, is inserted into the lower end of the package between the sheets 10 and 11. The lower string 14 is then applied to hold the lower end of the package together and to hold the capsule 17 in position.

The resultant bean sprouting kit as illustrated in Figures 1, 2 and 3 (or Figure 5) has been designated in Figure 6 by the numeral 18 and the package has been shown as being arranged within an ordinary glass fruit jar 19. The paper sheet 11 may be sufficiently stiff to render the kit 18 selfsupporting within the jar 19 when inserted therein. If desired, however, a supporting string 20 may be tied to the upper end of the kit 18 by the user, or the bag may be sold provided with such string. This string may have its ends extended out of the top of the jar 19 and wrapped and tied around the conventional threads at the upper end of the jar. The string 20 will positively support the kit in the vertical position shown in Figure 6. The dotted line 21 indicates the approximate level of the water in the jar 19 at the starting of the method, and after the initial soaking period is over, the water in the jar may be poured out to reduce the water level as indicated by the numeral 22.

The practice of the method when using the kit described above is as follows:

The kit is placed in the jar 19 or other vessel and positively supported in the manner described by the string 20 if necessary or desired. In the form of the invention shown in Figure 2 either end of the bag may be inserted first into the jar and the beans will drop to the lower end of the bag. With the form of the invention shown in Figure 5 the end of the bag containing the capsule 17 must be inserted first so that this capsule will remain immersed in the water. The jar 19 is then filled with water to the level indicated by the numeral 21 and is then put aside to allow the beans 15 to soak over night, or for approximately twelve hours. The beans will thus absorb the necessary moisture to initiate the sprouting action.

The water in the jar 19 is then poured down to the approximate level indicated by the numeral 22, or the water may be poured off completely and fresh water put in up to the level 22. The water level 22 is approximately at the bottom of the lowermost bean in the kit and the quantity of water between this level and the bottom of the jar is sufficient for absorption by the beans during the sprouting period. Referring to Figure 2 it will be noted that the sheet 11 is so formed into an envelope as to provide portions projecting substantially beyond the beans at one end of the envelope, and such projecting portion of the sheet end is immersed in water during the sprouting period. When the kit shown in Figure 5 is used, the water will not be changed since the capsule 17 will have dissolved and the material therein will be in solution in the water. The jar is then set aside for the necessary sprouting period of from three to five days, preferably in a dark place, or at least away from the direct rays of strong light. The perforations 12 in the sheet 11 permit the access of air to the beans through the envelope formed by the porous sheet 10. At the same time, the sheet 10 being absorbent, will carry water from the bottom of the jar by capillary attraction to the beans which are already wet and are retained in contact with each other. However, the interstices between the beans will allow air to come in contact with all of the beans in the package.

At the end of three days the bag may be drawn upwardly from the jar to a sufficient extent to allow for the cutting of a hole through the upper portions of the sheets 10 and 11 so that the beans can be inspected to determine the progress in the sprouting action, and when such action is completed, the bag may be withdrawn from the jar and opened for the removal of the beans. The properly sprouted beans are now ready for cooking.

The kit serves to maintain the beans in contact with each other so that moisture carried upwardly by the sheet 10 will be supplied by the capillarity of the sheet 10 to the beans in contact therewith, while the capillarity of the beans themselves, in contact with each other, will carry moisture to every bean in the package. A predetermined quantity of beans in proportion to the capacity of the package will be placed in the bag in dry form, the proportion of beans to the capacity of the bag being sufficient to allow for the swelling of the beans incident to the sprouting action.

The envelope formed by the sheet 10 performs the functions referred to while the sheet 11 serves as a protective covering for the sheet 10 and the beans, and provides the necessary structural strength which is lacking in the sheet 10 because of its soft absorbent characteristics. It will be obvious that the kit provides a unit of beans which may be sold in food stores exactly as shown and described, except that, if desired, an outer wrapper may be provided in order to protect the sheet 11 from dust and dirt until the kit is ready for use.

The form of the invention shown in Figure 5 is provided when it is desirable to positively prevent contamination or stagnation of the water in the jar 19. The chemical-containing capsule 17 is soluble in water but protects the chlorinated lime or similar deliquescent chemical until the device is ready for use. After being immersed in the body of water for a relatively short period of time the capsule will dissolve and release the chlorinated lime to permit the latter to seep into the body of water for the purpose stated.

The method and kit may be used in connection with any dried bean seeds as will be obvious. All beans are high in protein content and the present method and kit provide an easy way in which a housewife may prepare bean sprouts without the necessity of having to repeatedly sprinkle the beans and shake them to assure the proper wetting and airing of all of the beans. The method and kit have been found particularly useful in the sprouting of soya beans, which, as well known, possess a particularly high degree of protein content.

From the foregoing it will be apparent that the present method broadly comprises the feeding of water to the beans solely by capillarity, after the beans have been soaked, as distinguished from the manual wetting of the beans by intermittently dipping or sprinkling them.

The method further comprises the complete sprouting of the beans by the two steps of initially soaking the beans and then maintaining them in a wet condition by supplying water to the beans by capillary action. More specifically as to the supplying of water to the beans by capillarity, the method comprises the enveloping of a quantity of beans in a jacket or envelope formed of porous highly absorbent material which serves to accomplish the two desired results of maintaining the previously soaked beans in contact with each other and of supplying water by capillary action to the outer beans, namely those in contact with the porous medium, the beans themselves within the body thereof serving to convey the water by capillary action so that all of the beans are maintained in a moist condition. Such a method, of course, avoids the immersing of the body of beans in water, and accordingly the interstices between the beans permit the access of the beans to air.

While I have described in detail the preferred practice of my method and preferred forms of devices with which it is to be used, it is to be understood that the forms of the device and the details of procedure of the method may be varied without departing from the spirit of the invention or the scope of the subjoined claims.

I claim:

1. A bean sprouting kit comprising an envelope formed of a plurality of layers of material adapted to be wrapped around and completely envelop a quantity of beans, the outer layer of material possessing a substantial degree of tensile strength and being perforated, the remaining layer of material being porous and highly absorbent, said envelope being elongated and having at least one end projecting beyond the body of beans therein to be inserted in a body of water whereby the absorbent layer of material will conduct water to the beans by capillarity, said end of said envelope having therein a water soluble capsule containing a non-poisonous disinfectant capable of preventing contamination and stagnation of the water when said end of said envelope is inserted in the water and said capsule dissolves.

2. A bean sprouting kit comprising a pair of rectangular sheets wrapped around a quantity of beans to form a complete enclosure therefor and having the corner portions of such enclosure extending inwardly angularly to form an envelope tapering to decrease in width toward its ends, and means for retaining the envelope in such form with the beans in the envelope spaced from the ends thereof, the outer layer of material of the envelope being perforated and formed of water-resistant material and the inner layer of material being porous and highly water-absorbent whereby, when one end of said envelope is inserted in water, the absorbent layer of material will carry water to the beans by capillary action.

3. A bean sprouting kit comprising a pair of rectangular sheets wrapped around a quantity of beans to form a complete enclosure therefor and having the corner portions of such enclosure extending inwardly angularly to form an envelope tapering to decrease in width toward its ends, means for retaining the envelope in such form with the beans in the envelope spaced from the ends thereof, the outer layer of material of the envelope being perforated and formed of water-resistant material and the inner layer of material being porous and highly water-absorbent whereby, when one end of said envelope is inserted in water, the absorbent layer of material will carry water to the beans by capillary action, and a quantity of a non-poisonous disinfectant carried by the last named end of said envelope to prevent contamination and stagnation of the water in which the last named end of the envelope is immersed.

4. A bean sprouting kit comprising a pair of rectangular sheets wrapped around a quantity of beans to form a complete enclosure therefor and having the corner portions of such enclosure extending inwardly angularly to form an envelope tapering to decrease in width toward its ends, means for retaining the envelope in such form with the beans in the envelope spaced from the ends thereof, the outer layer of material of the envelope being perforated and formed of water-resistant material and the inner layer of material being porous and highly water-absorbent whereby, when one end of said envelope is inserted in water, the absorbent layer of material will carry water to the beans by capillary action, and a water-soluble capsule within the last named end of said envelope and containing a non-poisonous disinfectant which, when said capsule dissolves upon immersion of the last named end of the envelope in water, will prevent contamination and stagnation of the water.

5. A bean sprouting kit comprising an envelope containing and completely surrounding a quantity of beans, said envelope being formed of porous absorbent flexible sheet material, one end of said envelope extending substantially beyond the beans therein whereby such end of the envelope may be immersed in water to a level below the beans to convey moisture to the latter solely by capillarity, and a perforate form-sustaining envelope of flexible sheet material surrounding the first named envelope in contact therewith, the flexibility of said form-sustaining envelope being such as to accommodate expansion of said first named envelope incident to the swelling of the beans.

6. A bean sprouting kit comprising an envelope containing and completely surrounding a quantity of beans, said envelope being formed of porous absorbent flexible sheet material, one end of said envelope extending substantially beyond the beans therein whereby such end of the envelope may be immersed in water to a level below the beans to convey moisture to the latter solely by capillarity, and a perforate form-sustaining envelope of flexible sheet material surrounding the first named envelope in contact therewith, the flexibility of said form-sustaining envelope being such as to accommodate expansion of said first named envelope incident to the swelling of the beans, and a capsule arranged between said envelopes adjacent the extended end of said first named envelope, said capsule being soluble and containing a non-poisonous disinfectant to prevent contamination and stagnation of the body of water.

7. The method of sprouting a body of dried beans enclosed in an envelope of porous flexible sheet material possessing a high degree of capillarity, which comprises substantially completely immersing the envelope in water to thoroughly soak the beans, removing the beans from such immersion, and then maintaining one end of the envelope in contact with a body of water at a level below the body of beans whereby water will be conducted to the beans solely by the capillary action of the envelope.

8. A bean sprouting kit comprising an envelope structure containing and completely surrounding a quantity of beans, said envelope structure being constructed for the passage of air therethrough and having an inner layer of porous highly absorbent material, a portion of which at one end of the envelope structure extends substantially beyond said body of beans whereby, when such projecting portion of said absorbent material is immersed in water, such material will carry moisture to the beans solely by capillarity.

DONALD C McGAHEY.

REFERENCES CITED

The following references are of record in the file of this patent:

UNITED STATES PATENTS

| Number | Name | Date |
| --- | --- | --- |
| 426,933 | Grossich | Apr. 29, 1890 |
| 1,123,281 | Harnden | Jan. 5, 1915 |
| 1,172,787 | Gray | Feb. 22, 1916 |
| 1,293,803 | Knutson | Feb. 11, 1919 |

FOREIGN PATENTS

| Number | Country | Date |
| --- | --- | --- |
| 20,825 | Great Britain | 1892 |

OTHER REFERENCES

Duggar, "Seed Disinfection," Ann. Mo. Bot. Garden, vol. 6 (1919), 159, 161.

Ward, "Encyclopedia of Food," published 1923, pp. 31, 32, article on Bean Sprouts.

McCay, "Sprouted Soy Beans," published Apr. 1943, by School of Nutrition, Cornell University, Ithaca, N. Y., pp. 2 and 3.